United States Patent [19]
Schenkel et al.

[11] Patent Number: 5,926,462
[45] Date of Patent: Jul. 20, 1999

[54] METHOD OF DETERMINING TOPOLOGY OF A NETWORK OF OBJECTS WHICH COMPARES THE SIMILARITY OF THE TRAFFIC SEQUENCES/VOLUMES OF A PAIR OF DEVICES

[75] Inventors: David Schenkel; Michael Slavitch; Nicholas Dawes, all of Ottawa, Canada

[73] Assignee: Loran Network Systems, LLC, Wilmington, Del.

[21] Appl. No.: 08/558,729

[22] Filed: Nov. 16, 1995

[51] Int. Cl.[6] .............................. H04L 12/28; H04L 1/00; H04J 1/16; H04J 3/14
[52] U.S. Cl. .......................... 370/254; 370/248; 370/253
[58] Field of Search ..................... 370/254, 255, 370/256, 257, 258, 248, 249, 253, 241, 400, 351, 252; 395/200.53

[56] References Cited

U.S. PATENT DOCUMENTS

| 5,450,408 | 9/1995 | Phaal . |
| 5,684,796 | 11/1997 | Abidi ..................................... 370/254 |

FOREIGN PATENT DOCUMENTS

| 455 402 | 4/1991 | European Pat. Off. . |
| WO94/19887 | 9/1994 | WIPO . |

OTHER PUBLICATIONS

IEEE Conference, 1989, XP000618680, Amer et al, "Management of Sampled Real–Time Network Measurements".

CA Conference 1994, Prague, XP000618685, Norton, 1994; "Integrating Network Discovery with Network Monitoring: The NSFNET Method".

Laboratory for Computer Science, MIT, XP000644618 Feldmeier, 1986; "Statistical Monitors for Local Area Networks".

Primary Examiner—Douglas W. Olms
Assistant Examiner—David R Vincent
Attorney, Agent, or Firm—Pascal & Associates

[57] ABSTRACT

A method of determining network topologies comprising monitoring traffic received by devices connected in the network and traffic emitted out of the devices, correlating traffic out of the devices with traffic into the devices, indicating a network communication path between a pair of the devices in the event that the correlation of traffic out of one of the pair of the devices and into another of the pair of the devices is in excess of a predetermined threshold.

15 Claims, 2 Drawing Sheets

METHOD OF DETERMINING TOPOLOGY OF A NETWORK OF OBJECTS WHICH COMPARES THE SIMILARITY OF THE TRAFFIC SEQUENCES/VOLUMES OF A PAIR OF DEVICES

FIELD OF THE INVENTION

This invention relates to a method of determining the topology of a network of objects, such as the physical topology of a network of data communications devices.

BACKGROUND TO THE INVENTION

Operators of many data communications networks are typically ignorant of the exact topology of the networks. The operators need to know the exact topology in order to properly manage the networks, for example, for the accurate diagnosis and correction of faults.

Network managers that do know the very recent topology of their network do so by one of two methods: an administrative method and an approximate AI (artificial intelligence) method.

Administrative methods require an entirely up to date record of the installation, removal, change in location and connectivity of every network device. Every such change in topology must be logged. These updates are periodically applied to a data base which the network operators use to display or examine the network topology. However, in most such systems the actual topology information made available to the operators is usually that of the previous day or previous days, because of the time lag in entering the updates. This method has the advantage that a network device discovery program need not be run to find out what devices exist in the network. This method has a disadvantage that it is almost impossible to keep the data base from which the topology is derived both free of error and entirely current.

The approximate AI methods use routing/bridging information available in various types of devices, for example, data routers typically contain routing tables. This routing information carries a mixture of direct information about directly connected devices and indirect information. The AI methods attempt to combine the information from all the devices in the network. This method requires that a network device discovery program be run to find out what devices exist in the network, or that such a list of devices be provided to the program. These approximate AI methods require massive amounts of detailed and very accurate knowledge about the internal tables and operations of all data communications devices in the network. These requirements make the AI methods complex, difficult to support and expensive. In addition, devices that do not provide connectivity information, such as ethernet or token ring concentrators must still be configured into the network topology by the administrative method. Consequently the approximate AI methods have not been adapted into general use.

SUMMARY OF THE INVENTION

The present invention exploits the fact that traffic flowing from a first device to a second device can be measured both as the output from the first device and as the input to the second device. The volume of traffic is counted periodically as it leaves the first device and as it arrives at the second device. With the two devices being in communication, the two sequences of measurements of the traffic volumes will tend to be very similar. The sequences of measurements of traffic leaving or arriving at other devices have been found in general, to tend to be different because of the random (and fractal) nature of traffic. Therefore, the devices which have the most similar sequences have been found to be likely to be interconnected. Devices can be discovered to be connected in pairs, in broadcast networks or in other topologies. This method is therefore extremely general. Various measures of similarity can be used to determine the communication path coupling. However the chi squared statistical probability has been shown to be robust and stable. Similarity can be established when the traffic is measured in different units, at different periodic frequencies, at periodic frequencies that vary and even in different measures (e.g. bytes as opposed to packets).

In accordance with an embodiment of the invention, a method of determining the existence of a communication link between a pair of devices is comprised of measuring traffic output from one device of the pair of the devices, measuring the traffic received by another device of the pair of devices, and declaring the existence of the communication link in the event the traffic is approximately the same.

Preferably the traffic parameter measured is its volume, although the invention is not restricted thereto.

In accordance with another embodiment of the invention, a method of determining network topologies is comprised of monitoring traffic received by devices connected in the network and traffic emitted out of the devices, correlating traffic out of the devices with traffic into the devices, indicating a network communication path between a pair of the devices in the event that the correlation of traffic out of one of the pair of the devices and into another of the pair of the devices is in excess of a predetermined threshold.

BRIEF INTRODUCTION TO THE DRAWINGS

A better understanding of the invention will be obtained by reference to the detailed description below, in conjunction with the following drawings, in which:

FIG. 1 is a block diagram of a structure on which the invention can be carried out, FIG. 2 is a block diagram of a part of a network topology, used to illustrate operation of the invention, and FIG. 3 is a flow chart of the invention in broad form.

DETAILED DESCRIPTION OF THE PREFERRED EMBODIMENTS

The invention will be described by reference to its theory of operation, and then by practical example. However, first, a description of a representative network with apparatus which can be used to implement the invention will be described.

Figure 1:
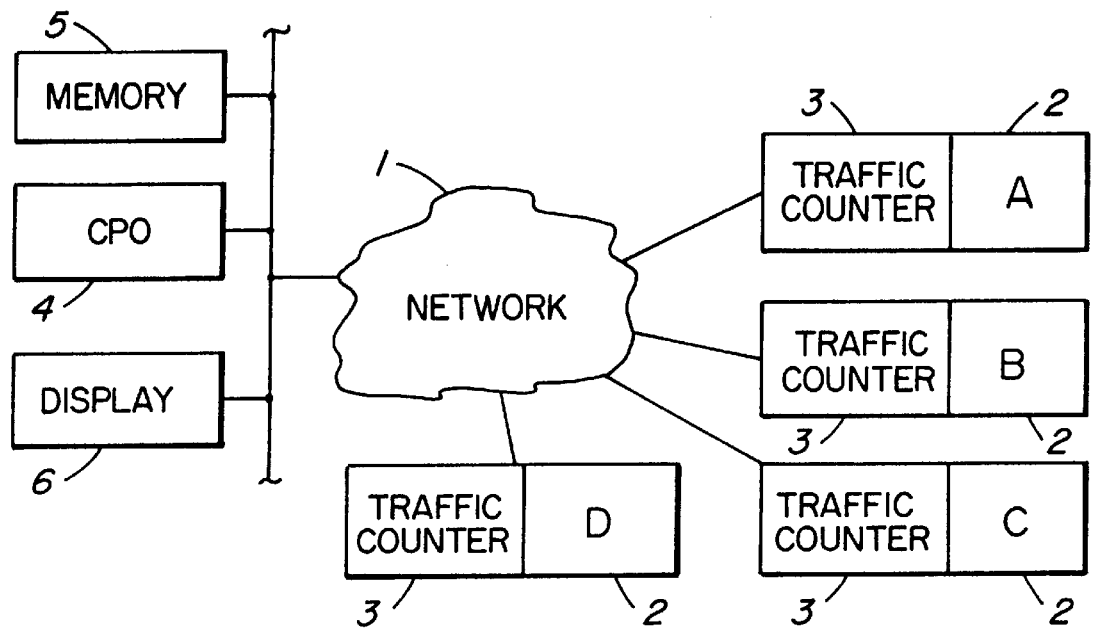

With reference to FIG. 1, a data communication network 1 can be comprised of devices such as various subnetworks, comprised of e.g. routers, serial lines, multiplexers, Ethernet™ local area networks (LANs), bridges, hubs, gateways, fiber rings, multibridges, fastpaths, mainframes, file servers and workstations, although the network is not limited to these elements. Such a network can be local, confined to a region, span a continent, or span the world. For the purposes of this description, illustrative devices are included in the network, and can communicate with each other via the network. Each of the devices contain a traffic counter 3, for counting the number of packets it received and the number of packets it transmitted, since reset of the traffic counter. Each device can be interrogated to provide both its address and with its address a count in the traffic counter of the number of packets. A network of devices such as the above is not novel.

A processor comprised of CPU 4, memory 5 and display 6 are also connected to the network, and can communicate with each of the devices 2 (A, B, C and D) connected to the network.

Figure 2:
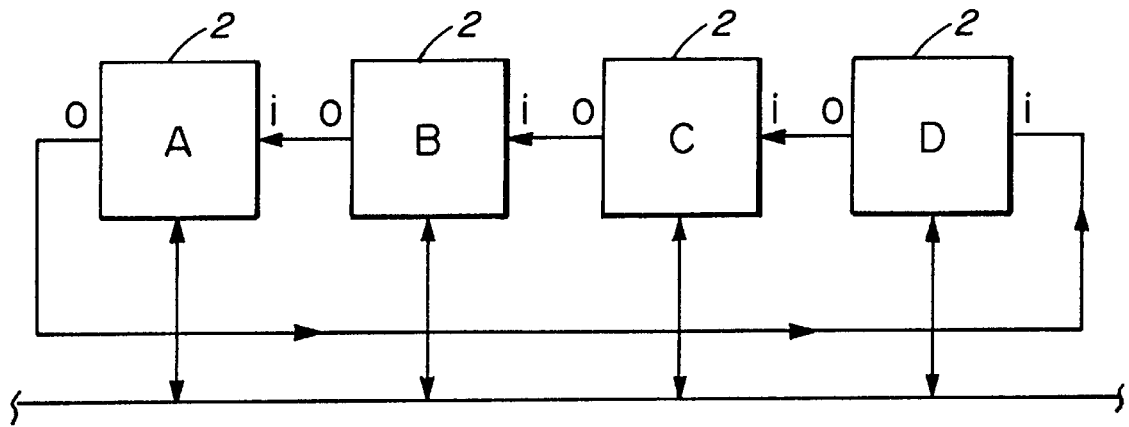

FIG. 2 illustrates communication paths between each of the four devices 2, which paths are unknown to the system operator. The output o of device A transmits to the input of device D, the output o of device D transmits to the input i of device C, the output o of device C transmits to the input i of device B, and the output o of device B transmits to the input i of device A. Each of the devices is also connected to the network 1, while any of the communication paths between the devices 2 may also be connected to the network 1 (not shown). However, the CPU can be in communication with each of the devices by other communication paths. In the examples described later the inventive method of discovering the communication paths, i.e. the topology of the part of the network between these devices will be used.

As a preliminary step, the existence and identity of each of the presumed devices that exist in the network is determined. Determination of the existence and identity of these devices is not novel, and is described for example in U.S. Pat. No. 5,185,860 issued Feb. 9th, 1993 and entitled AUTOMATIC DISCOVERY OF NETWORK ELEMENTS and which is assigned to Hewlett-Packard Company.

The invention will first be described in theoretical, and then practical terms with respect to the example network described above.

Each device in the network must have some activity whose rate can be measured. The particular activity measured in a device must remain the same for the duration of the sequence of measurements. The activities measured in different devices need not be the same but the various activities measured should be related. The relationships between the rates of the different activities in devices should be linear or defined by one of a set of known functions (although a variation of this requirement will be described later). An example of activities that are so related are percentage CPU utilization in a data packet switch and its packet throughput. It should be noted that the functions that relate different activity measures need not be exact.

The units (e.g. cms/sec or inches/min) in which an activity are measured can vary from device to device but must remain constant for the duration of the sequence of measurements.

This method of discovery does not depend on particular relationships between the intervals between collection of activity measurements and the rates of activity, except that should the activity rates be so low that few intervals record any activity, more measurements may need to be recorded to reach a certain accuracy of topological discovery.

This method of discovery does not depend on particular relationships between the intervals between collection of activity measurements and the transit time between devices except that should the intervals between measurements be much smaller than the transit time between devices, more measurements may need to be recorded to reach a certain accuracy of topological discovery.

The activity of the devices in the network should be measured in sequences. There are four aspects to such measurements: how to measure the activity, who or what measures activity, when to measure the activity and lastly transmitting the measurements to this method for determining network topology.

Measurements made be made in four ways:
a: directly from observations made inside the device:
b: directly from observations made of the device from outside:
c: computed from observations made inside the device:
d: computed from observations made of the device from outside.

Examples of these are as follows:
a: CPU utilization in a computer:
b: number of frames transmitted on a communications line, counted in a data router connected to this line:
c: number of packets transmitted per active virtual circuit in an data router:
d: temperature of an device computed from spectral observations.

All such activity which is measured should be construed in this specification as "traffic".

The activity can be then be expressed as any function or combination of functions of the four classes of observations.

For example, let the activity of an device be directly measured as the number of operations of a certain type that it has carried out since it was started. The computed measurement could be the difference between the number of such operations now and the number of such operations at the time of the previous measurement.

Measurements may be made by the device itself, by another network device, by a device external to the network or by a combination of devices internal and external to the network. Measurement devices are not restricted to electronic or mechanical means. Any mixture of measuring methods may be used. Different devices may be measured by different measuring methods from each other and such measuring methods may change with time for devices.

Activity can be measured at regular periodic intervals or at irregular intervals. Different devices in the network can have their activities measured in either way. Individual devices can use a mixture of methods. Sufficient temporal data must be collected or recorded at the time of each measurement of activity on each device to allow the time at which each measurement was made to be determined, either absolutely or with respect to some relative standard.

The accuracy with which the time needs to be recorded to achieve a certain level of performance of this method will vary from network to network.

The measurements of activity may be transmitted directly or indirectly from devices 2 to CPU 4 for processing to determine the network topology. The measurements may be made, stored and then retrieved, or may be transmitted directly, or transmitted by some mixture of these methods. The transmission of the measurements may use the inband or outband communications facilities of the network (should they exist for the network) or any other means of communication. These options permit the operation of the invention for topological discovery in realtime or later.

The network itself can be used to transmit the measurements and should this transmission affect activity as measured, then the operation of the invention can itself, on a network with very low activity, generate relatively significant activity. This can be exploited to improve the speed of discovery, to operate the method effectively during very inactive or quiet periods and for other advantages.

In its simplest form each device in the network is selected in turn. Let device 'a' have been selected. The sequence of measurements for this device 'a' is compared with the sequence of measurements for every other device. The device with the sequence of measurements most similar to that of 'a' is considered to be connected to 'a'.

There are several methods for restricting or indicating probably correct connections, as follows. These can generally be used in any combination.

(a) A proposed connection with a corresponding similarity measure with less than a chosen value can be rejected.

(b) Proposed connections are preferred to be displayed or indicated with some direct or indirect notification of the associated probability (e.g. green if more probable than a cutoff, yellow if less probable).

(c) The maximum similarity for any known to be correct connection after a given sequence length or time period can be recorded. Putative connections with similarity less than this empirical level should be considered invalid and should not be included in the proposed network topology.

(d) Some devices will be connected in a broadcast or other manner, such that they are apparently or actually connected to more than one other device. Should this be considered a possibility for the network in question, the following extra sequence should be used once the suggested pair connections have been determined:

Let device 'a' be assessed as being connected to device 'b'. Should the similarity measure between device 'a' and a further device 'c' be probably the same as the similarity measure between device 'a' and device 'b', then device 'a' should be considered as being connected to both device 'b' and device 'c'. This search for extra connections could be unrestricted (e.g. allowing all devices in the network to be connected together) or restricted by a number (e.g. allowing no more than 48 devices ever to be connected together).

Once the measurements for a pair of devices have been made (either they are complete or at least 1 measurement has been made on each device), the two sequences of activity of the two devices can be compared. The two sequences of measurements may need to be time aligned, functionally mapped and normalised before having their similarity computed.

The following definitions are used below, in this specification:

A: a measure of the quantity of activity that has passed since the previous measure was reported by this device. $A(j,1)$ is the first measurement made for device j.

Activity: some operation or combination of operations in or including an device. The rate of such operations must be measurable.

Activity sequence: a series of measurements of activity rates made at recorded variable intervals or at fixed periodic intervals for a device.

Class: a device may belong to one or more classes (e.g. bridges, routers)

Discovery: the determination of what devices exist in the network, but not how they are connected.

$g_s(x)$: a functional transform of the value of the measure of activity x. The subscript s indicates which from a possible set of transform functions is being used.

G: the total number of different transform functions in the set $g_s$.

L: the number of measurements in two sequences that are to be compared.

N: there are N devices in the network.

Physical or Logical Device: an device can be physical or logical. The network consists partially or entirely of devices that can be located in the network. Each device that can be located must have some measurable activity and this activity should be related to some measurable activity of the device or devices connected to this device.

S(a,b): the similarity of device b compared to device a.

Sequence length: the number of measurements of activity made in a given activity sequence.

Similarity: an arithmetic measure of likelihood that two activity sequences have been measured from devices that are connected together (see S). Likelihood increases as the similarity measure increases.

Sum: $Sum(j)$ is the sum of the activity measurements in a sequence for the device (j).

T: a transformed measure of the volume of activity that has passed since the previous measure was reported by this device. $T(j,i)$ is the i'th measurement made for device j, transformed by the function chosen from the set g.

T*: $T^*(j,i)$ is the normalized ith measurement made for device j such that over L measurements, the sum of $T^*(j,i)$=the sum of $T(k,i)$ for some preference device k.

Topology: how the devices in the network are connected.

x: $x(j,i)$ is the value of the i'th time aligned activity measurement for device j.

y: $y(j,i)$ is the value of the i'th activity measurement for device j.

Device: an input or output communications port of a physical or logical device. Each device that can be located must be able to measure and report some measure of the traffic or activity at this port, or to have such a measurement made on it and reported (eg: by an external agent).

Device index: the letter j indicates which device (1 . . . N) is being referred to.

Device suffix: the suffix i indicates the input side (traffic arriving at this device). The suffix o indicates the output side (traffic leaving this device).

Discovery machine: the machine, possibly connected to the network, that is running the method.

j: the letter j indicates which device (1 . . . N) is being referred to.

MIB: Management information base. A set of monitored values or specified values of variables for a device. This is held in the device or by a software agent acting for this device.

Polling: sending an SNMP request to a specified device to return a measure (defined in the request) from the MIB in that device.

Traffic sequence: a series of measurements of traffic rates or volumes made at recorded variable intervals or at fixed period intervals for a device (input or output).

The following describes how sequences of measurements made at possible varying periodic intervals and at possibly different times for two different devices can be time aligned. This alignment, necessary only if the activity measures vary with time, can greatly improve the accuracy of determining which devices are connected to each other, given a certain number of measurements. It can correspondingly greatly reduce the number of measurements needed to reach a certain level of accuracy in determining which devices are connected to each other. The method is carried out by CPU 4, using memory 5.

The measurements from the sequence for device b (ie:y (b,i)) are interpolated and, if necessary, extrapolated, to align them with the times of the measurements in the sequence for device a (i.e.: y(a,i)). This interpolation can be done using linear, polynomial or other methods: e.g.: natural cubic splines, for example as described in W. H. Press, S. A. Teukolsky, B. P. Flannery, W. T. Vetterring: "Numerical Recipes in Pascal. The Art of Scientific Computing": Cambridge University Press, 1992, and C. E. Froberg: "Numerical Mathematics: Theory and Computer Applications": Benjamin Cummings, 1985. The interpolation will be more accurate if the form of the function used for the interpolation more closely follows the underlying time variation of the activity in device +b+.

Should the measurements in +b+ be started after those in +a+, the measurements in the +b+ sequence generally cannot be safely extrapolated backwards a time greater than the average time between measurements in the +b+ sequence. Similarly, should the measurements in +b+ stop before those in +a+, the measurements in the +b+ sequence generally cannot be safely extrapolated forward a time greater than the average time between measurements in the +b+ sequence. In some cases extrapolation beyond one or other end may reduce the accuracy of the method. In other cases extrapolation beyond one or other end may improve the accuracy of the method.

L (the number of measurements to be used in comparing the two sequences) is the number of measurements in the sequence of device +a+ that have corresponding interpolated or extrapolated time aligned measurements in the sequence for device +b+. The aligned data is copied into the arrays x(b, 1 . . . L) and x(a, 1 . . . L) for devices 'b' and 'a' respectively.

Comparison between two activity sequences is only done once the measurements in each sequence have been first transformed and then normalised. The transform process permits different types of measure of activity to be compared even though they are not linearly related. The normalisation process permits linear related measures of activity to be compared, regardless of the units they are measured in.

The transform function for the sequence from device +a+ is chosen from the set g. The transform function for the sequence from device +b+ is chosen from the set g. For each possible combination of such functions, the resulting sequences are then normalised as described below and then are compared as will be described below. Since there are G functions in the set g, this means that G2 such comparisons will be carried out.

For a chosen function $g_s$ from the set g:

$$T(j,i) = g_s(x(j,i))$$

The set g will generally contain the linear direct transform function:

$$g_1(x) = x$$

Other functions may be added to this set g should they be suspected or known to exist as relationships between different activity measures. For example, should activity measure y be known to vary as the log(x) for the same device, the following two functions would be added to the set g.

$$g_2(x) = \log(x)$$
$$g_3(x) = \exp(x)$$

The sum of all the traffic measurements T(b, 1 . . . L) in the sequence for device +b+ is adjusted to equal the sum of all the traffic measurements T(a, 1 . . . L) in the sequence for device +a+. This corresponds to normalising the sequence T(b,i) with respect to T(a,i). This automatically compensates for differences in units of measure. It also automatically compensates for linear functional differences between the activities that may be measured on device +a+ and device +b+.

In detail, for i=1 . . . L:

$$T^*(b,i) = T(b,i) \, \text{Sum}(a)/\text{Sum}(b)$$
$$T^*(a,i) = T(a,i)$$

The similarity between $T^*(a,i)$ and $T^*(b,i)$ for the range of i=1 . . . L is determined as follows. In other words, the probability that two observed sets of data are drawn from the same distribution function is determined. The similarity can be established by a wide variety of similarity measures. Any statistical measure or test of similarity between two single measurements, between a time series of measurements or of the distribution of values in two sets of measurements could be used. The robustness and effectiveness of particular similarity measures will vary with the network topology, the patterns of activity in the network and on the forms of the measures. An incomplete list of such measures is least squares, chi-squared test, Student's t-test of means, F-test on variance, Kolmogorov-Smirnov test, entropy measures, regression analysis and the many nonparametric statistical methods such as the Wilcoxon rank sum test. Various forms of such measures are described in H. O. Lancaster: "The Chi-Squared Distribution", Wiley, 1969, R. L. Scheaffer, J. T. McClave: "Statistics for Engineers", Duxbury, 1982, and R. von Mises: "Mathematical Theory of Probability and Statistics", Academic Press, 1964.

One of the most widely used and accepted forms of such similarity comparison is the chi-squared method, and is suitable for discovering the topology of many types of networks. So, by way of example using the chi-squared measure:

To compute S(a,b)=chi-squared probability that the sequence for +b+ ($T^*(b,i)$, i=1 . . . L) is drawn from the same distribution as the sequence as +a+ ($T^*(a,i)$, i=1 . . . L).

let:

$$Q = \Sigma[(T^*(a,i) - T^*(b,i))^2 / (T^*(a,i) + T^*(b,i))] \text{ for } i=1 \ldots L \qquad 1$$

and let all L measurements in both $T^*(a,i)$ and $T^*(b,i)$ (for i=1 . . . L) be nonzero; then we have L−1 degrees of freedom (because the two sequences were sum normalised): giving, for this example:

$$S(a,b) = \text{incomplete gamma function } (Q, L-1)$$

It should be noted that the similarity measure has been defined to increase as the likelihood of the two devices being connected increases. This means that a similarity measure such as least squares would be mapped by, for example:

$$S(a,b) - \Sigma(T^*(a,i) - T^*(b,i))^2$$

The incomplete gamma function used for chi-squared probability calculation is described in, for example, H. O. Lancaster: "The Chi-Squared Distribution", Wiley, 1969.

It should be noted that we are comparing two effectively binned data sets so the denominator in equation 1 approximates the variance of the difference of two normal quantities.

The method described above requires every device to be compared to every other device twice, using the full sequence measured so far. This is means the computational complexity (for N devices, with L measurements for each but assuming G=1) is:

complexity is proportional to: $N^2 L$.

The following variations in design can improve the efficiency of the method. The improvements will depend on the network, the devices in it, the activities measured and their distributions with respect to time. The variations can be used in a great variety of combinations.

(a) Curtail search once a reasonable fit has been found

Once a connection to device +a+ has been found that has a probability greater than the cutoff, do not consider any other devices.

(b) Do not consider devices already connected

Devices that already have an acceptable connection found should not be considered in further searches against other devices.

(c) Curtail comparison of sequences before L is reached

During the determination of the similarity of +a+ to +b+ should it already be certain that the final estimate of this similarity be less than a cutoff, discontinue this determination. This cutoff would either be the best similarity already found for this device 'a', or the minimum. Not all similarity measures are amenable to this curtailment.

(d) Examine similar devices first

The order in which devices are compared to devices +a+ can be set so that those devices with some attribute or attributes most similar to +a+ are checked first. For example, in a TCP/IP data communications network one might first consider devices which had IP addresses most similar to device 'a'.

(e) Restrict search by class

In many networks devices can only connect to a subset of other devices, based on the two classes of the devices. Therefore, should such class exclusion or inclusion logic be available and should the classes of some or all devices be known, the search for possible connections can be restricted to those devices that may connect, excluding those that may not.

The classes to which devices can connect can, for some devices (e.g.: data communications routers), be extracted from the device itself.

(f) Use fewer measurements

Should the method be operated with only a subset of the measurements, complexity is reduced. Should an acceptable connection be found to an device, it need not be considered with a larger number of measurements. This subset of the sequence of measurements can be made such that the subset is not sequential in the list of measurements, nor need its start or end coincide with that of the original full set of measurements.

(g) Use fewer measurements to start with

The variation of (f) could be used to create a short list of possible connections to each device using a few measurements. Only devices on this list will even be considered as candidates for connection to this device using a large subset or the full set.

(h) Discovering the network in parts

The network topology may be known to exist in portions. These portions may each only have one or a few connections between them. The devices in each portion can be assigned a particular class and devices only within the same portion class considered for connection to each other. Each portion of the network could then be connected to others by connections discovered in a separate pass or discovered in another way (e.g. administratively). This variation in the method reduces the computational complexity by reducing the effective N (number of devices) to be compared to each other.

(i) Discovering the network in parts in parallel

The method can be run simultaneously or serially on more than one system. Each system can be responsible for discovering part of the network. The parts could then be assembled together.

(j) Using a multiprocessor system

The method can be operated in parallel. Each of a number of processors could be assigned a portion of the similarity calculations (e.g.: processor A is given devices 1–10 to be compared to all other devices, processor B is given devices 11–20 to be compared to all other devices and so on).

(k) Using the devices to perform the calculation for themselves

The devices themselves, should they be capable of such processing, could be given the activity sequences of all devices or a subset of the devices. Each device then assesses for itself the devices to which it is connected. It would, as appropriate, report this to one or more sites for collection of the network topology.

The subset of devices for which an device might restrict its search could be generally those within a given class. Such a class might be defined by being within a certain time of flight, or being with a certain subset of labels.

The traffic sequences need not be time aligned and normalised other than by the device itself (e.g.: it could take a copy of the activity measurements as they are transmitted, perhaps restricting its collection of such measurements to devices within a certain class).

(l) Summary of computational improvements

The impact of the variations above can reduce the complexity enormously. For example, in data communications networks the use of variations (a), (b), (c) and (g) in combination has been observed to reduce the complexity to be approximately linear in N (the number of network devices) and to be invariant with L (the total number of measurements made on each device). This was true both in a very broadcast oriented network and in a very pair-wise connected network.

The application of the method to a particular problem of discovering the topology of a particular class of data communications networks will now be described. The mapping of the general theory onto this particular application is performed primarily by replacing the general concepts of devices and activity by devices and traffic respectively. However, this particular data communication network is assumed to collect measurements using polling.

There are three main steps to this embodiment of the invention: discovering the devices in the network, collecting sequences of measurements of the traffic from the devices and comparing these sequences to determine which devices are connected together. This can be carried out by CPU 4 with memory 5.

A particular class of data communications networks have the following characteristics:

a: its measurements are requested by polling using inband signalling, b: its measurements are returned using inband signalling, c: polling is performed preferably every 60 seconds, d: a single machine (e.g. CPU 4 with memory 5) operates the method for determining the topology. This machine also performs the polling of the devices 2 and receives the polling replies from the devices, and e: all devices of interest in the network can have their traffic measured.

The existence and network addresses can be determined by the administrative method described above, or by automated methods, such as described in U.S. Pat. No. 5,185,860, referred to above.

In a successful prototype of the invention a time indication from 0 . . . 59 was randomly allocated to each device in the network. This time defined how many seconds after the beginning of each minute the discovery machine should wait before sending a device its request for the total traffic measured so far. Of course, these requests are interleaved so that in a large network many requests should be sent out each second. All devices will therefore get a request every minute and this request (for a device) will be sent out very nearly at one minute intervals. The reason the times should be randomly allocated is to smooth out the load on the network, since inband signalling was used.

Each device 2 on receipt of a poll should extract the value of the variable requested from the traffic counter 3 (the total traffic since reset, measured in packets) and should send this back preferably in an SNMP format packet to the discovery machine. On receipt, the address of the device 2, the time of arrival of this information is stored along with the value of the counter, indexed for this device. The new value of the counter is subtracted from the previous one in order to compute the total traffic measured in the last minute, not the total since that device was reset. In this way a sequence of traffic measurements for all the devices in parallel is built up and stored in memory 5.

Before two traffic sequences (for device +a+ and device +b+) can be compared, they are time aligned, functionally mapped and then normalised as described earlier. The measurements from the second sequence (b) are interpolated to align them with the times of the measurements in the first sequence (a). Since the only function for mapping considered in this example is the direct linear mapping, no functional mapping is performed on any measurements.

For normalization, let the shorter of the two sequences have length L. The sum of all the traffic measurements 1 . . . L in the sequence for device +b+ is adjusted to equal the sum of all the traffic measurements 1 . . . L in the sequence for device +a+. This corresponds to normalising the sequence T(b,i) with respect to T(a,i).

The chi-square probability comparison of the sequences computes the similarity. S(a,b)=chi-squared probability that the traffic sequence for +b+ (T*(b,i), i=1 . . . L) is drawn from the same distribution as the traffic sequence for +a+ (T(a,i), i=1 . . . L).

The device +x+ with the highest value of S(a,x) is the one most probably connected to +a+.

A probability cutoff (threshold) of a minimum value of F can be applied. If the highest value of S(a,x) is less than this cutoff, that means that device +a+ has no device considered to be connected to it after a certain number of polls. A suitable such cutoff, for a network with N devices, might be 0.01/N, given perhaps more than 10–15 measurements of traffic on each device.

As indicated above, a number of the devices in the network may be connected in broadcast mode: i.e. they may be apparently or actually connected to more than one other device. The logic described above can therefore be applied. For example, any device +a+ can be considered to be connected to all devices z for which S(a,z) is greater than some cutoff.

A variety of similarity measures from the possible list described earlier were experimentally tested. These tests were carried out on a simulated network of 2000 devices and also on data collected from a real network, which had over 1500 devices. The first was connected pairwise, and the second network had a mixture of broadcast and pairwise connections.

The measure of similarity which required fewest average measurements to produce the correct topologies was:

$$S(a,b)=\Sigma[(T^*(a,i)-T^*(b,i))^2/(T^*(a,i)^2)]V^*(a,i)/Li=1\ldots L$$

This similarity measure was better than the chi-squared probability, likely for the following reasons. The chi-squared measure assumes that traffic measurements are normally distributed, which may not be true. The chi-squared difference, as computed in equation 1 above has $T^*(b,i)$ as well as $T^*(a,i)$ in its denominator. This means that should the device 'a' have a very flat sequence and device 'b' have a flat sequence with just one spike in it, at the point of comparison of the spike to the flat sequence the chi-squared difference may understate the significance of the spike.

It was also observed that the chi-squared difference divided by L or by L−1 was as effective and required much less CPU time than the chi-squared probability. In other words, the calculation on the incomplete gamma function to compute the probability associated with the chi-squared difference was, for these cases, unnecessary and very expensive in CPU time.

Thus it appears clear that selection of the appropriate similarity measure can improve performance (speed and accuracy of topological recognition) on different types of networks.

In data communications networks traffic has random and fractal components. The random nature of the traffic means that over a short period of time the traffic patterns between two devices will tend to differ from the traffic patterns between any two other devices. In other words, when measured over several intervals, the random nature will tend to provide differentiation in the absence of any other distinguishing underlying difference. However, should the periods between measurements be very long and the mean traffic rates between pairs of devices tend to be similar, it is the fractal nature of the traffic that will now help ensure that the patterns of traffic between pairs of devices will tend to be significantly different, again in the absence of any other distinguishing underlying difference. The fractal nature of traffic (as described by W. E. Leland, W. Willinger, M. S. Taqqu, W. V. Wilson in: "On the Self-Similar Nature of Ethernet Traffic": ACM SIGCOMM, computer Communication Review, pp 203–213, January 1995) means that the volume of traffic on a particular link can be correlated to the volume traffic earlier on that link. This correlation will, in general, be different for every such link.

Returning to the example network described above with reference to FIG. 2, there are four devices 2 being monitored in the network: A, B, C and D. Each device generates and receives traffic. This means the input rate on each device is not simply related to the output rate on the same device. The network is polled in this example using inband signalling. The chi-squared probability has been chosen for the similarity measure.

In the network:

Ai connects to Bo.

Bi connects to Co.

Ci connects to Do.

Di connects to Ao.

The preliminary network discovery program is run and returns with the 8 port addresses for these four devices.

The 8 addresses found are sent polls at the end of each minute, for 5 minutes, asking for the value of the variable that measures the total traffic transmitted (in packets) since reset for this device. Notice that the devices were reset at somewhat different times in the past, so they have different starting counts. However, also note that all the traffic measurements are already time aligned, so no interpolation is required. This corresponds to the monitoring traffic step in the flow chart of FIG. 3.

| i =   | 1  | 2  | 3  | 4  | 5  |
|-------|----|----|----|----|----|
| 1:$A_i$ | 1  | 3  | 6  | 10 | 15 |
| 2:$A_o$ | 11 | 13 | 14 | 15 | 16 |
| 3:$B_i$ | 22 | 24 | 27 | 29 | 30 |
| 4:$B_o$ | 11 | 13 | 16 | 20 | 25 |
| 5:$C_i$ | 2  | 4  | 7  | 11 | 15 |
| 6:$C_o$ | 2  | 4  | 7  | 9  | 10 |
| 7:$D_i$ | 11 | 13 | 14 | 15 | 16 |
| 8:$D_o$ | 42 | 44 | 47 | 51 | 55 |

The change in traffic over the last minute is now computed, obviously only for minutes 2, 3, 4 and 5.

| i =   | 2 | 3 | 4 | 5 |
|-------|---|---|---|---|
| 1:$A_i$ | 2 | 3 | 4 | 5 |
| 2:$A_o$ | 2 | 1 | 1 | 1 |
| 3:$B_i$ | 2 | 3 | 2 | 1 |
| 4:$B_o$ | 2 | 3 | 4 | 5 |
| 5:$C_i$ | 2 | 3 | 4 | 4 |
| 6:$C_o$ | 2 | 3 | 2 | 1 |
| 7:$D_i$ | 2 | 1 | 1 | 1 |
| 8:$D_o$ | 2 | 3 | 4 | 4 |

Figure 3:
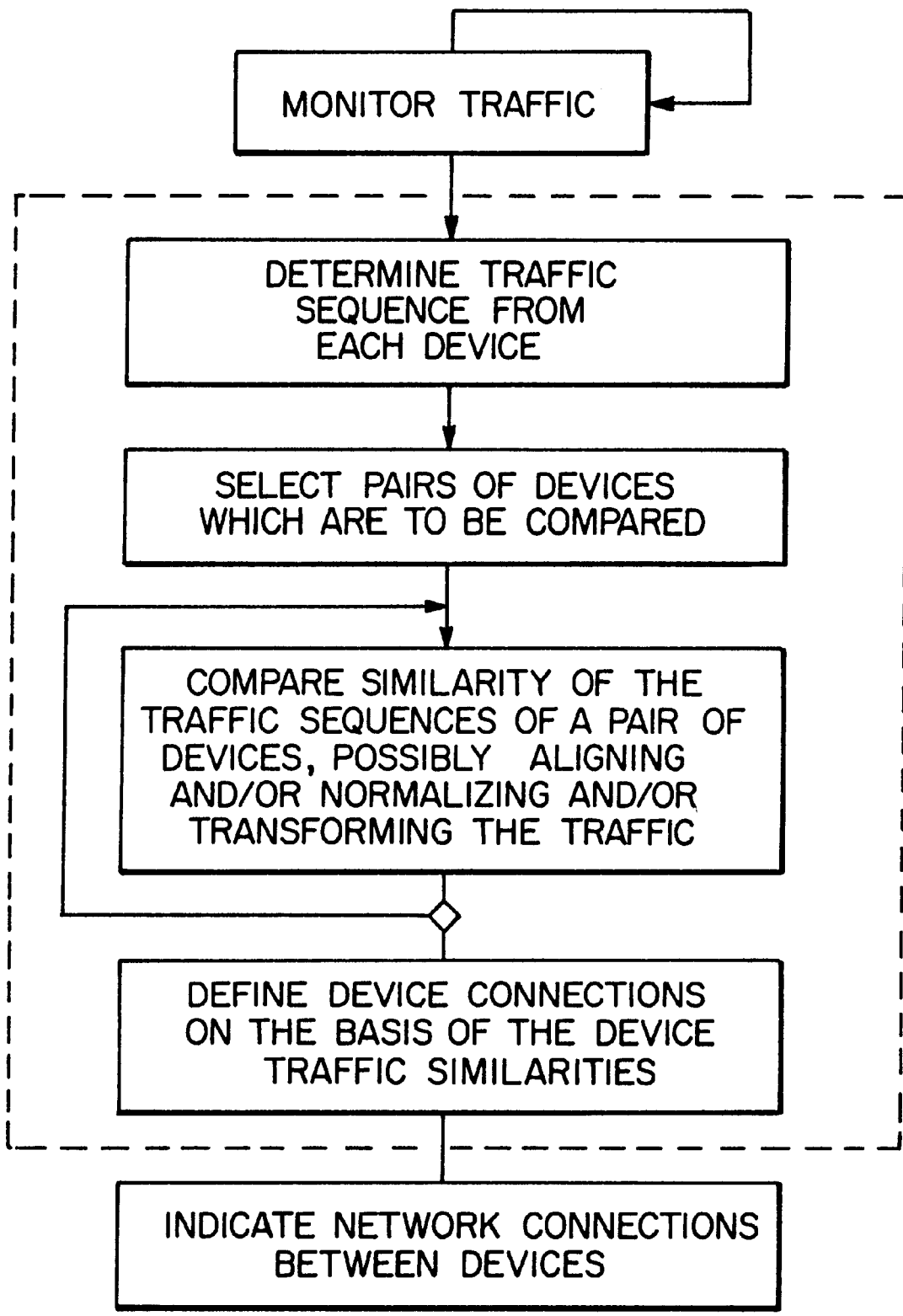

The similarity for each of the 8 addresses with respect to the other 7 (considered as 8 devices) is now computed (the correlation step of FIG. 3). It is obvious in this simple example that the devices connected to each other have exactly the same sequences. However, in detail let us examine the comparison of Ai with Di. No time alignment is needed.

EXAMPLE 1

$$S(A_i, D_i)$$

1: They both have length 4 (i.e. four time differences) so the length to be used in comparison is 4.

2: The sum of the traffic values of Ai=14. The sum of the traffic values of Di=5. The normalised traffic values of Di are now:

| i =  | 2   | 3   | 4   | 5   |
|------|-----|-----|-----|-----|
| T*   | 5.6 | 2.8 | 2.8 | 2.8 |

3: The values for Ai are still:

| i = | 2 | 3 | 4 | 5 |
|-----|---|---|---|---|
| T*  | 2 | 3 | 4 | 5 |

4: The chi-squared is computed as follows:
chi-squared=$(2-5.6)^2/(2+5.6)+(3-2.8)^2/(3+2.8)+(4-2.8)^2/(4+2.8)+(5-2.8)^2/(5+2.8)$
chi-squared=2.59

5: There are 3 degrees of freedom for the chi-squared probability calculation as there are 4 points compared and the second set of points was normalised to the first (removing one degree of freedom).

The incomplete gamma function (chi-squared, degrees of freedom) can now be used with (2.59, 3) to give:
S(Ai, Di)=0.4673

EXAMPLE 2

$$S(A_i, B_o)$$

1: They both have time difference length 4 so the length to be used in comparison is 4.

2: The sum of the traffic values of Ai=14. The sum of the traffic values of Bo=14. The normalised traffic value of Bo are now:

| i = | 2 | 3 | 4 | 5 |
|-----|---|---|---|---|
| T*  | 2 | 3 | 4 | 5 |

3: The values for Ai are still:

| i = | 2 | 3 | 4 | 5 |
|-----|---|---|---|---|
| T*  | 2 | 3 | 4 | 5 |

4: The chi-squared is computed as follows:
chi-squared=$(2-2)^2/(2+2)+(3-3)^2/(3+3)+(4-4)^2/(4+4)+(5-5)^2/(5+5)$
chi-squared=0.0

5: There are 3 degrees of freedom for the chi-squared probability calculation as there are 4 points compared and the second set of points was normalised to the first (removing one degree of freedom).

The incomplete gamma function (chi-squared, degrees of freedom) can now used with (0.0, 3) to give: S(Ai, Bo)=1.0

The following table gives the similarity measures for the different devices being compared to each other. Notice the asymmetry caused by the sum normalisation.

|     | Ai     | Ao     | Bi     | Bo     | Ci     | Co     | Di     | Do     |
|-----|--------|--------|--------|--------|--------|--------|--------|--------|
| Ai: |        | 0.4673 | 0.4538 | 1.0600 | 0.9944 | 0.4538 | 0.4673 | 0.9944 |
| Ao: | 0.8233 |        | 0.9069 | 0.8233 | 0.8527 | 0.9069 | 1.0000 | 0.8527 |
| Bi: | 0.6828 | 0.8288 |        | 0.6828 | 0.7716 | 1.0000 | 0.8288 | 0.7716 |
| Bo: | 1.0000 | 0.4673 | 0.4538 |        | 0.9944 | 0.4538 | 0.4673 | 0.9944 |
| Ci: | 0.9950 | 0.5632 | 0.6096 | 0.9950 |        | 0.6096 | 0.5632 | 1.0000 |
| Co: | 0.6828 | 0.8288 | 1.0000 | 0.6828 | 0.7716 |        | 0.8288 | 0.7716 |
| Di: | 0.8233 | 1.0000 | 0.9069 | 0.8233 | 0.8527 | 0.9069 |        | 0.8527 |
| Do: | 0.9950 | 0.5632 | 0.6096 | 0.9950 | 1.0000 | 0.6096 | 0.5632 |        |

It may be seen that the correlation 1.000 is the highest correlation value, and can be extracted (e.g. by setting a threshold below it but above other correlation values) to indicate on display 6 the network topology connecting the device whose addresses are in the rows and columns intersecting at the correlation 1.000. These, it will be noted, correspond exactly to the table of interconnections of devices which was given earlier. The display can be e.g. in table form, in graphical map form, or whatever form is desired. This corresponds to the indication step in FIG. 3.

It should be noted that devices need not have both input and output sides and these sides can be combined. The traffic may be retrieved by methods other than polling, for example by a proxy agent (a software agent). The information could be sent autonomously by devices (as in the OSI network management protocol). A mixture of polling and autonomous methods can coexist.

The network topology can be determined after time T and then again at T+dt. Should there be no changes in the topology the operator could be informed of this, which indicates that a stable solution has been found. Should a stable solution be found and then change, that indicates that an device has moved or that something has broken or become faulty. The particular change will help define this.

In router dominated data network, port tracer packets can be sent to devices and will return with the sequence of router devices they passed through. This can be used to partially verify that the topology is correct. It could also be used to help establish the functional relationships between measured activities.

This method can in general use just one measure of activity per device. All the measurements on the different devices would have to be made sufficiently close in time that the activities would not change significantly during the interval taken to take all the measurements (should they not be made in parallel). Should only one measure of activity be made, sum normalisation and time normalisation should not be applied.

The three processes (discovery of what devices are in the network, collecting measures of activity and computing the topology) in the method can run continuously and/or in parallel. This allows changes in topology (e.g. breaks) to be detected in real time.

It was indicated earlier that the method works if the function relating different activities was known, at least approximately. However, one could operate this method in order to discover such a function, knowing at least one or more of the correct connections. The rest of the network topology, or just the function (or functions) or both can thereby be found. The entire topology discovery method is then used with an initial estimate of the possible function set $g_s$. The resulting topology is then be compared to the known topology (or subset if that was all that was known). The estimates of the possible functions are then be changed and the method repeated. In this way the estimate of the possible functions can be optimised.

A second variation on this approach does not rely on any prior knowledge of the network. The mean probability of the suggested connections are considered as the parameter which is optimised, rather than the number of correct connections. Other variations using either a mixture of probability and correct counts, or functions of one or both can be used.

The network could alternatively be partially defined and then the method used to complete the rest of the topology.

The frequency of measurements can be adapted so that the communications facilities (inband or outband or other) are not either overloaded or not loaded above a certain level. This allows use of this method in a less intrusive manner.

Instead of only one activity being measured per device, several or many dimensions of activity can be measured. In this case the activity sequences are multi-dimensional. The discovery of the network topology can be executed in parallel, one discovery for each dimension. The resulting network topologies from the different dimensions can then be fused, overlayed, combined or used for other analysis (such as difference analysis for diagnosis). Alternatively the activity measures can be made multi-dimensional and the topology found using this multi-dimensional measure, rather than the uni-dimensional one described. The relative weight of the different dimensions can be adjusted statically or dynamically to attempt to achieve performance goals.

The present method can be used in combination with the AI method for several purposes. It could check that the routing or other tables used by the AI method and extracted by the AI method from network devices were consistent. For example, perhaps two physical communications lines may be available for one city to another, and both are connected, but only one may have been entered into the router tables. The present invention can detect this discrepancy.

Differences between the topologies found by this method and by the administrative method could be used to detect unauthorized additions or changes to the network. Differences could be tracked for other purposes.

The network operator could restrict the network topology discovery to devices with levels of activity above a certain level, as well as performing the general topological discovery (perhaps earlier or later).

In a data communications network the present method could be used to find the sources and sinks of unusually high traffic levels, such as levels that may be causing intermittent problems. This knowledge could alternatively be used to assist network configuration and planning (e.g. placing matched pairs of sources and sinks locally or by adding communications capacity).

In other types of networks this selection of the busiest devices would show the major operations and topology of the network (e.g. heart, major arteries and major veins), without worrying about perhaps irrelevant minor details (e.g. capillaries).

A series of such investigations with different cutoff levels of activity could be used to identify the major busy and less busy regions of the network, again for planning, model discovery or diagnosis.

It should be noted that the devices in the network can be really discrete (e.g. communications devices) or conceptually discrete (e.g. arbitrarily chosen volumes in a solid). The following is an example list of the things that can be measured and the consequent topologies that can or might be discovered using the present invention. It should be noted that discovering the topology may have value, or determining that the topology has changed or that it is normal or abnormal may also have value. Any of these may be predictive of an event or events, diagnostic of a fault or faults, and/or correlated to a particular model, including the discovery of the mechanics of processes and models.

a: Electrical activity in neurons or neuronal regions of the brain allowing the topology of the brain used for various activities to be determined.

b: Electrical signals and information transfers in communications systems: data, voice and mixed forms in static, mobile, satellite and hybrid networks.

c: volume flow of fluids: for plumbing; heating; cooling; nuclear reactors; oil refineries; chemical plants; sewage networks; weather forecasting; flows in and from aquifers; blood circulation (such as in the heart); other biological fluids; sub, intra and supra tectonic flows of lava, semisolids and solids.

d: flow of information or rates of use in software systems and mixed software hardware systems allowing the logical and physical topology of software and hardware elements and devices to be determined.

e: device flows: fish, bird and animal migration paths; tracks and routes of vehicles;

f: heat flow: particularly a surface or volume up into elements, one can describe the flow vectors of heat through the elements and hence deduce a probabilistic flow network. The measured attribute could be direct (e.g. black body emission signature) or indirect (e.g. electrical resistance).

g: nutrient and nutrient waste flow: certain nutrients get consumed more rapidly by rapidly growing parts (e.g. cancers) than by other parts. The flow of nutrients will tend to be abnormal towards such abnormal growths and similar the flow of waste will be abnormally large away from them.

h: the automated discovery of the network topology enables a number of applications in data communications: e.g. direct input of the topology with the traffic measurements to a congestion prediction package.

i: the discovery of economic and system operational models, leading to discovery of ways to change, influence, direct or improve them.

j: In general:
biological diagnosis, model discovery and validation; volcanic eruption and earthquake prediction; refinery operations startup modelling for replication; operational efficiency improvements by spotting bottlenecks and possibilities for shortcuts (in organizations and systems).

A person understanding this invention may now conceive of alternative structures and embodiments or variations of the above. All of those which fall within the scope of the claims appended hereto are considered to be part of the present invention.

We claim:

1. A method of determining network topologies comprising:
   (a) monitoring traffic received by devices connected in the network and traffic emitted out of said devices,
   (b) correlating traffic out of said devices with traffic into said devices,
   (c) indicating a network communication path between a pair of said devices in the event that the correlation of traffic out of one of said pair of said devices and into another of said pair of said devices is in excess of a predetermined threshold,
   (d) the step of correlation being comprised of time aligning said monitored traffic to form a pair of sequences having the same time interval and a common beginning and end time, and
   (e) normalizing said sequences.

2. A method as defined in claim 1 in which the step of correlating is comprised of analyzing said normalized sequences to obtain a correlation value.

3. A method as defined in claim 2 in which each device includes a traffic counter, and in which the monitoring step is comprised of interrogating each traffic counter to obtain a traffic count to obtain an indication of said traffic for said correlating step.

4. A method as defined in claim 2 in which the monitoring step is comprised of interrogating each device to obtain a sampling of traffic over a predetermined time period for said correlating step.

5. A method as defined in claim 3 including repeating said interrogation step at predetermined intervals.

6. A method as defined in claim 5 including a preliminary step of polling each of said devices to obtain an identity of each of said devices for use in said interrogating step, and at least temporarily storing each traffic indication with a time of arrival of said traffic indication and an identity of a device providing said traffic indication.

7. A method as defined in claim 6 in which the network is a communication network, and in which said indicated traffic is a count of data units accumulated in said traffic counter.

8. A method as defined in claim 2 further comprising at least one of the steps of:
   (i) curtailing monitoring said traffic between further pairs of devices including one of said pair of devices in the event a correlation is in excess of a said predetermined threshold,
   (ii) avoiding monitoring said traffic between further pairs of devices which include any device of said pair of devices for which a correlation was previously determined to be in excess of said predetermined threshold,
   (iii) curtailing monitoring said traffic between further pairs of devices including one of said pair of devices in the event a correlation is determined to be unlikely to reach said predetermined threshold,
   (iv) monitoring said traffic between pairs of similar devices prior to monitoring said traffic between the other pairs of devices,
   (v) avoiding monitoring said traffic between pairs of devices of which one device of said pair is in a class determined to be sufficiently different from another device of said pair that the devices of said pair are unlikely to be in communication,
   (vi) monitoring said traffic with a first number of traffic measurements and then monitoring said traffic further with a significantly larger number of traffic measurements than the first number only in the event that a determined correlation is not in excess of said predetermined threshold,
   (vii) monitoring said traffic with a second number of traffic measurements and then monitoring said traffic further with a significantly larger number of traffic measurements than the second number only in the event that a determined correlation is in excess of said predetermined threshold,
   (viii) monitoring and correlating said traffic between pairs of devices contained within each of separate parts of said network, and monitoring and correlating said traffic between said separate pairs of said network, and
   (ix) monitoring and correlating said traffic separately between pairs of devices contacted within each of separate parts of said network, and indicating network communication paths between said separate parts of said network.

9. A method as defined in claim 2 including carrying out step (a) in each of plural ones of said devices, and reporting said monitored traffic from time to time to a central data collection means.

10. A method as defined in claim 9 including carrying out the time aligning and normalizing steps within each of said plural ones of said devices.

11. A method as defined in claim 2, in which said network is a communication network, including monitoring said traffic by polling using inband signalling and indicating said traffic by said devices by inband signalling.

12. A method as defined in claim 11 including polling each device approximately every 60 seconds.

13. A method of determining the existence of a communication link between a pair of devices comprising measuring the volume of traffic output from one device of the pair of devices, measuring the volume of traffic received by another device of the pair of devices, and declaring the existence of the communication link in the event the volumes are approximately or identically the same, said traffic being comprised of a form of energy.

14. A method as defined in claim 13 in which said energy represents data.

15. A method of determining the existence of a communication link between a pair of devices comprising measuring the volume of traffic output from one device of the pair of devices, measuring the volume of traffic received by another device of the pair of devices, and declaring the existence of the communication link in the event the volumes are approximately or identically the same, said traffic being comprised of a fluid.

* * * * *

UNITED STATES PATENT AND TRADEMARK OFFICE
CERTIFICATE OF CORRECTION

PATENT NO.    : 5,926,462
DATED         : July 20, 1999
INVENTOR(S)   : David Schenkel et al.

It is certified that error appears in the above-identified patent and that said Letters Patent is hereby corrected as shown below:

<u>Title page,</u>
Item [75], change the order of the inventors from "David Schenkel; Michael Slavitch; Nicholas Dawes, all of Ottawa, Canada" to read as follows:
-- Nicholas Dawes; David Schenkel; Michael Slavitch, all of Ottawa, Canada --

Signed and Sealed this

Twenty-second Day of January, 2002

*Attest:*

JAMES E. ROGAN
*Attesting Officer*    *Director of the United States Patent and Trademark Office*